3,636,209
COCCIDIOSIS TREATMENT
Leonard M. Weinstock, Rocky Hill, Roger J. Tull, Metuchen, and Peter I. Pollak, Scotch Plains, N.J., assignors to Merck & Co., Inc., Rahway, N.J.
No Drawing. Application Aug. 1, 1966, Ser. No. 569,014, now Patent No. 3,467,653, dated Sept. 16, 1969, which is a continuation-in-part of application Ser. No. 496,700, Oct. 15, 1965. Divided and this application Apr. 11, 1969, Ser. No. 835,840
Int. Cl. A61k 27/00
U.S. Cl. 424—229
16 Claims

ABSTRACT OF THE DISCLOSURE

Anticoccidial 3-alkenyloxy (alkynyloxy or alkoxy)-4-sufanilamido-1,2,5-thiodiazoles, or the $N^4$-acyl derivatives thereof, are prepared by treating a 3-chloro-4-alkenyloxy (alkynyloxy or alkoxy)-1,2,5-thiodiazole with sulfanilamide or an $N^4$-acylsulfanilamide in the presence of an alkali metal base to produce an alkali metal salt of the sulfathiadiazole which is converted to the free base by acidification of the reaction mixture. It is contemplated that compositions containing such sulfathiodiazoles as the essential active ingredient will be administered orally in treatment and control of coccidiosis in poultry.

This application is a division of copending application Ser. No. 569,014, filed Aug. 1, 1966, is now U.S. Pat. 3,467,653, issued Sept. 16, 1969, which is a continuation-in-part of copending application Ser. 496,700, filed Oct. 15, 1965 and now abandoned.

This invention relates to sulfathiadiazole compounds, and to anticoccidial compositions containing such substances. More particularly, it is concerned with novel anticoccidial compositions containing certain 3-alkenyloxy, 3-alknyloxy, and 3-alkoxy-4-sulfanilamido-1,2,5-thiadiazoles. It relates also to novel 3-alkynyloxy and 3-alkenyloxy-4-sulfanilamido-1,2,5-thiadiazole compounds, and to the chemical synthesis thereof.

Certain sulfanilamido-1,2,5-thiadiazoles are described in the chemical art, although the literature reports are by no means extensive. 3-sulfanilamido-1,2,5-thiadiazole itself is known to have anticoccidial properties, but its antiparasitic activity is not as high as might be desired. Research has therefore continued with the objective of discovering more potent antiparasitic sulfanilamido-1,2,5-thiadiazoles. It is one object of the present invention to provide novel, highly active anticoccidial compositions. A further object is provision of an effective method for combatting coccidiosis. A more specific object is provision of anticoccidial compositions containing as an active ingredient a 4-sulfanilamido-1,2,5-thiadiazole having an ether substituent at the 3-position of the thiadiazole ring, and of the method for combatting poultry coccidiosis by the oral administration of such compounds. A still further object is provision of a method for the chemical synthesis of such 3-ether-4-sulfanilamido-1,2,5-thiadiazoles. An additional object of the invention is provision of new compounds, namely 3-alkenyloxy-4-sulfanilamido-1,2,5-thiadiazole, and 3-alkynyloxy-4-sulfanilamido-1,2,5-thiadiazoles, which exhibit antibacterial activity and an unexpectedly high degree of anticoccidial activity, and a method for synthesizing them. Other objects will become apparent from the ensuing description of the invention.

In accordance with this invention it has now been discovered that sulfathiadiazole compounds of the Formula I below, and the alkali and alkaline earth metal salts thereof exhibit significant activity against the poultry disease coccidiosis:

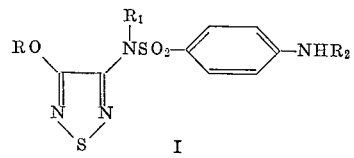

R in this structure represents loweralkenyl, such as allyl, methallyl or crotyl, loweralkynyl, such as 2-butynyl, 2-propynyl, 3-butynyl, 3-pentynyl or loweralkyl having at least two carbon atoms, examples of which are n-propyl, isopropyl, ethyl and isobutyl; $R_1$ represents hydrogen, an alkali metal such as sodium or potassium, or an alkaline earth metal such as calcium or magnesium; $R_2$ represents hydrogen or acyl, preferably loweralkanoyl such as acetyl and propionoyl, or benzoyl.

Coccidiosis is a severe parasitic disease. In poultry it is caused by species of parasites of the genus Eimeria, and particularly by E. tenella, E. necatrix, E. brunetti, E. maxima, E. acervulina, as well as others. This disease is manifested in fowl by poor weight gain, reduced feed efficiency, and high mortality.

The 3 - loweralkenyloxy - 4-sulfanilamido-1,2,5-thiadiazoles, the 3-loweralkynyloxy-4-sulfanilamido-1,2,5-thiadiazoles, and the 3-loweralkoxy-4-sulfanilamido-1,2,5-thiadiazoles of Formula I are highly effective in preventing the development of coccidiosis, and especially poultry coccidiosis, and in the treatment of existing infection, when administered to the infected animals in small amounts. They are particularly effective against poultry coccidiosis due to E. brunetti, although their usefulness is not limited to this form of the disease. Oral administration to poultry via the feedstuff or drinking water of the birds is the normal and preferred mode of administration.

One anticoccidial composition provided in accordance with the invention is a poultry feedstuff having a minor but anticoccidially effective quantity of 3-OR-4-sulfanilamido-1,2,5-thiadiazole, or a metal salt or $N^4$-acyl derivative thereof, intimately dispersed therein, R being loweralkenyl, loweralkynyl, or loweralkyl of at least two carbon atoms. Good prophylactic results are obtained when such a 3-substituted-4-sulfanilamido-1,2,5-thiadiazole is administered to poultry in an amount equal to about 0.0005% to about 0.05% by weight of daily solid feed intake. With the preferred compounds, good control of the disease is achieved with feed concentration levels of from about 0.00075% to about 0.025% by weight. Higher dose levels of up to about 0.05%–0.1% by weight of the feed consumed are advantageously employed for short-term therapeutic treatment of an established coccidiosis outbreak. The optimum dose level will, of course, vary somewhat depending on the specific compound employed, and the type and severity of coccidial infection involved. The solid finished feeds containing a coccidiostat of this invention dispersed or distributed therein are any of those usually employed in the poultry raising industry, and are nutritionally adequate ones, normally containing a source of fat, protein, carbohydrate, minerals, vitamins, and other nutritional factors. The feed containing the desired dose level of coccidiostat, i.e. percent by weight concentration, is fed ad libitum to the poultry. As will be understood by those skilled in this art, the dose level of drug administered is customarily expressed in terms of concentration in the feed of the birds, rather than in terms of poultry weight.

The 3-loweralkenyloxy, 3-loweralkynyloxy and 3-loweralkoxy-4-sulfanilamido-1,2,5-thiadiazoles of Formula I may also be administered to poultry by way of the drinking water of the birds. When this route is used for prevention of coccidiosis, the treatment levels in the water are generally about one-half of those that would be used in a solid feedstuff, since the birds drink about twice as much as they eat. This method of treatment is advantageously employed in the therapeutic use of the compounds, since poultry infected with coccidiosis consume less solid feed than normal healthy birds. The compounds may be added directly to the drinking water, or alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from about 0.1–20% by weight of active compound are suitable. When the coccidiostats described herein are to be used in drinking water, it is frequently advantageous to employ a water-soluble salt. For this purpose, alkali metal salts such as sodium or potassium salts or alkaline earth metal salts such as the calcium and magnesium salts are preferred. Liquid formulations intended for addition to the drinking water may contain minor amounts of surfactants, solubilizers, or suspending agents such as dimethylpolysiloxane, polyoxyethylene sorbitan monooleate propylene glycol.

According to a further and preferred aspect of the invention, novel anticoccidial compositions are provided which comprise a 3-loweralkenyloxy-4-sulfanilamido-1,2,5 - thiadiazole, 3 - loweralkynyloxy-4-sulfanilamido-1,2,5-thiadiazole, or 3-loweralkoxy-4-sulfanilamido-1,2,5-thiadiazole of Formula I above intimately dispersed in or admixed with an inert edible carrier or diluent. Such carrier is ordinarily an element of animal sustenance, i.e. one that is or may be an ingredient of the animal feed, and that has some degree of nutritive value for the animal. These solid compositions are the so-called feed supplements or feed premixes which contain the 3-alkenyloxy, 3-alkynyloxy, or 3-alkoxy-4-sulfanilamido-1,2,5-thiadiazole compound in relatively large amounts and which are designed for addition to the poultry feed either directly or after an intermediate dilution or blending step. Examples of nutritive carriers or diluents suitable for such compositions are animal feed ingredients such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone, and the like. The coccidiostat is intimately dispersed or admixed throughout such solid carrier by techniques such as grinding, stirring, milling, or tumbling. By selecting proper diluents and by altering the ratio of carrier to active ingredient, compositions of any desired concentration may be prepared. Formulations containing from about 5% to about 40% by weight, and preferably from about 10–30% by weight of anticoccidial agent are particularly suitable for addition to poultry feedstuffs. The active compound is usually dispersed or mixed uniformly in the diluent, but in some instances may be sorbed on the carrier. Since it is convenient for the feed manufacturer to use about one pound of feed supplement for each ton of finished feed, the preferred concentration in the supplement is frequently a function of the level of active ingredient desired in the finished feed.

Examples of such poultry feed supplements are:

(A)

| | Lbs. |
|---|---|
| 3-allyloxy-4-sulfanilamido-1,2,5-thiadiazole | 5.0 |
| Wheat middlings | 95.0 |

(B)

| | |
|---|---|
| 3-crotyloxy-4-sulfanilamido-1,2,5-thiadiazole | 15.0 |
| Wheat shorts | 35.0 |
| Distillers' dried grains | 50.0 |

(C)

| | |
|---|---|
| 3-allyloxy-4-sulfanilamido-1,2,5-thiadiazole | 15.0 |
| Amprolium | 25.0 |
| Corn distillers' dried grains | 60.0 |

(D)

| | |
|---|---|
| 3 - methallyloxy-4-(N⁴-acetylsulfanilamido)1,2,5-thiadiazole | 20.0 |
| Distillers' dried grains | 80.0 |

(E)

| | |
|---|---|
| 3-n-propoxy-4-sulfanilamido-1,2,5-thiadiazole | 25.0 |
| Wheat standard middlings | 75.0 |

(F)

| | |
|---|---|
| 3-ethoxy-4-sulfanilamido-1,2,5-thiadiazole | 30.0 |
| Corn germ meal | 20.0 |
| Corn distillers' grains | 50.0 |

(G)

| | |
|---|---|
| 3-(2-butynyloxy)-4-sulfanilamido-1,2,5-thiadiazole | 5.0 |
| Wheat middlings | 95.0 |

(H)

| | |
|---|---|
| 3-(2-butynyloxy)-4-sulfanilamido-1,2,5-thiadiazole | 15.0 |
| Amprolium | 25.0 |
| Corn distillers' dried grains | 60.0 |

(I)

| | |
|---|---|
| 3-(2-propynyloxy)-4-sulfanilamido-1,2,5-thiadiazole | 5.0 |
| Wheat middlings | 95.0 |

These supplements are prepared by mechanical milling or mixing of the ingredients to insure uniform distribution of the active compound.

The feed supplements of the type illustrated are usually further diluted with feed ingredients such as corn meal or soybean meal before being incorporated in the animal feed. In this intermediate processing step the level of coccidiostat is reduced, thus facilitating uniform distribution of the substances in the finished feed which is a nutritionally adequate one, normally containing a source of fat, protein, carbohydrate, minerals, vitamins, and other nutritional factors.

In addition to the use of the 3-substituted-4-sulfanilamido-1,2,5 - thiadiazoles described herein as anticoccidial agents alone, the invention also contemplates poultry feed and feed supplement compositions, and drinking water formulations containing such thiadiazole together with one or more other anticoccidial compounds, and the concurrent administration of such combinations. This practice of using more than one coccidiostat is frequently employed in commercial practice. For such purposes, compositions are provided containing the 3-alkenyloxy, 3-alkynyloxy, or 3-alkoxy-4-sulfanilamido-1,2,5 - thiadiazole compound admixed with one or more other coccidiostats such as nicarbazin, ethopabate, 3,3' - dinitrodiphenyldisulfide, arsanilic acid, 3-amino-4-hydroxy-phenylarsonic acid, 5 - nitrofurfural semicarbazone, 3,5 - dinitrobenzamide, 2 - methyl - 3,5- dinitrobenzamide, sulfaquinoxaline, amprolium and the like.

It will further be understood by those skilled in this art that special feed supplement formulations and finished animal feeds containing vitamins, antibiotics, growth-promoting agents, and other nutritional substances may include the thiadiazole of this invention. A typical product of this type is the following:

| Ingredient: | Amount/lb. of supplement, grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate (mg.) | 1.30 |
| Procain penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| 3-allyloxy-4-sulfanilamido-1,2,5-thiadiazole | 23.00 |
| Distillers' grains to 1 pound. | |

Specific examples of 3 - substituted - 4-sulfanilamido-1,2,5-thiadiazoles provided by this invention are 3-allyloxy-4-sulfanilamido-1,2,5-thiadiazole,
3-allyloxy-4-sulfanilamido-1,2,5-thiadiazole potassium salt,
3-allyloxy-4-($N^4$-acetylsulfanilamido)-1,2,5-thiadiazole,
3-crotyloxy-4-sulfanilamido-1,2,5-thiadiazole,
3-methallyloxy-4-($N^4$-benzoylsulfanilamido)-1,2,5-thiadiazole,
3-n-propoxy-4-sulfanilamido-1,2,5-thiadiazole,
3-n-propoxy-4-($N^4$-acetylsulfanilamido)-1,2,5-thiadiazole sodium salt,
3-(2-propynyloxy)-4-sulfanilamido-1,2,5-thiadiazole,
3-(2-propynyloxy)-4-($N^4$-acetylsulfanilamido)-1,2,5-thiadiazole,
3-(2-butynyloxy)-4-sulfanilamido-1,2,5-thiadiazole,
3-(2-butynyloxy)-4-sulfanilamido-1,2,5-thiadiazole, potassium salt, and
3-(2-butynyloxy)-4-($N^4$-acetylsulfanilamido)-1,2,5-thiadiazole.

Although the system nomenclature used herein to describe the active anticoccidial compounds of the invention and methods of synthesizing them is believed to be the most simple and direct system, it should be noted that other nomenclature may be used to define the same substances. Thus, for instance, the 3-loweralkenyl-oxy-4-sulfanilamido-1,2,5-thiadiazoles, the 3 - (2-butynyloxy)-4 - sulfanilamido - 1,2,5 - thiadiazole, and the 3-loweralkoxy - 4 - sulfanilamido-1,2,5 - thiadiazoles may also be defined as $N^1$ - (4 - loweralkenyloxy - 1,2,5-thiadiazol-3-yl) sulfanilamides, $N^1$-(4-loweralkoxy-1,2,5-thiadiazol-3-yl) sulfanilamides, and $N^1$ - (4-loweralkynyloxy-1,2,5-thiadiazol-3-yl) sulfanilamides.

Although all of the thiadiazole compounds defined by Formula I above are useful in combatting coccidiosis, those novel substances in which R of Formula I represents loweralkenyl or loweralkynyl constitute a preferred embodiment of the invention since they exhibit an unexpectedly high degree of anticoccidial activity which in some cases is four times the activity of 3-sulfanilamido-1,2,5-thiadiazole itself. Of the 3-loweralkenyloxy series of compounds, 3 - allyloxy - 4 - sulfanilamido - 1,2,5-thiadiazole, and its salts, is a particularly preferred embodiment of the invention. Of the 3 - loweralkynyloxy series of compounds, 3-(2-butynyloxy)-4-sulfanilamido-1,2,5-thiadiazole and its salts, is also a particularly preferred embodiment of the invention.

Since the 3-loweralkynyl and the 3-loweralkenyloxy-4-sulfanilamido-1,2,5 - thiadiazoles are the preferred embodiments of the invention, emphasis will be placed upon them in the ensuing description of chemical synthesis. It should be understood, however, that similar processes are employed to obtain the 3-loweralkoxy - 4 - sulfanilamido-1,2,5 - thiadiazoles, the only difference being in selection of the appropriate 1,2,5 - thiadiazole starting material.

The 3-alkenyloxy-(or alkoxy or alkynyloxy)-4-sulfanilamido-1,2,5-thiadiazoles are prepared by the reaction of 3-chloro-4-alkenyloxy- (or alkoxy or alkynyloxy)-1,2,5-thiadiazole with sulfanilamide or an $N_4$ - acylsulfanilamide:

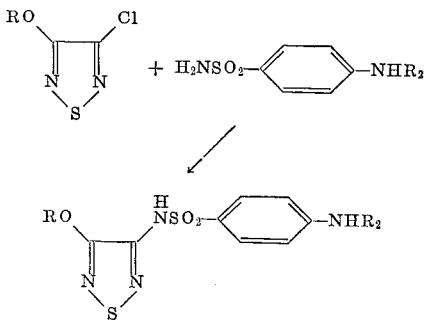

R in the above formulas is loweralkenyl, e.g. allyl, methallyl, crotyl, loweralkynyl, such as 2-butynyl, 3-butynyl, 2-propynyl, or loweralkyl having at least two carbons, e.g. n-propyl, isopropyl, ethyl, butyl; $R_2$ is hydrogen or acyl such as benzoyl or loweralkanoyl, e.g. acetyl, propionyl, or butyryl.

The reaction is carried out in the presence of a base, which should be a sufficiently strong base to abstract a proton from the sulfanilamide reactant with formation of the sulfanilamide anion. It is preferred to use an alkali or alkaline earth metal carbonate as the base (i.e. acid binding agent), examples being sodium, potassium, or calcium carbonate, but others such as alkali metal hydroxides may be employed if desired. Generally, a molar excess of sulfanilamide or $N^4$-acyl sulfanilamide is employed, and good results are obtained with from 1.5–5 moles of sulfanilamide compound per mole of 3-chloro-4-alkenyloxy-1,2,5-thiadiazole. The acid-binding agent is likewise employed in molar excess (with respect to thiadiazole reactant), and it is preferred to have at least a molar equivalent of base per mole of sulfanilamide.

For optimum results, the condensation is carried out at elevated temperatures of from about 80–200° C., and preferably about 110–175° C. Reaction periods of from ½–8 hours are generally adequate to obtain the desired 3-alkenyloxy-(alkynyloxy or alkoxy) - 4 - sulfanilamido-1,2,5-thiadiazole, with longer times being required at the lower reaction temperature. An extraneous solvent may be used, but is not essential since the thiadiazole reactant is liquid at the preferred reaction temperature and provides fluidity to the reaction mass. High-boiling solvents such as butylbenzene, diethylbenzene, and Decalin are frequently helpful, however, to permit adequate mixing of the reactants.

The 3-loweralkenyloxy-(alkynyloxy or alkoxy)-4-sulfanilamido-1,2,5-thiadiazole, or $N^4$-acyl derivative thereof, is produced initially as a metal salt, and generally a sodium or potassium salt since alkali metal carbonates are the preferred acid binding agents. The product is normally and conveniently recovered by acidification of the reaction medium (after addition of water). Any unreacted sulfanilamide precipitates at about pH 8 and is removed. On further acidification to about pH 3–5 the desired sulfathiadiazole is precipitated. Under these conditions the salt is neutralized and the 3-loweralkenyloxy-(alkynyloxy or alkoxy)-4-sulfanilamido-1,2,5-thiadiazole or $N^4$-acyl derivative thereof precipitates. The salt may be recovered directly from the reaction mixture after removal of excess sulfanilamide, but the product obtained in this way is not highly pure. When salts are desired, it is preferred to prepare them from the parent compound by treating a solution of the 3-alkenyloxy-(alkynyloxy or alkoxy)-4-sulfanilamido-1,2,5-thiadiazole with a strong base such as an alkali metal hydroxide or alkoxide, and then precipitating the salt.

When 3 - loweralkenyloxy - (alkynyloxy or alkoxy)-4-($N^4$-acylsulfanilamido) - 1,2,5 - thiadiazoles are desired, they are obtained as above using $N^4$-acylsulfanilamide as the starting material. The $N^4$-acyl radical remains intact during isolation in the presence of acid as long as the acidic mixture is not heated for any extended period of time. Alternatively, 3-loweralkenyloxy-(alkynyloxy or alkoxy)-4-sulfanilamido-1,2,5-thiadiazole may be reacted with an acylating agent, e.g. acetic acid-acetic anhydride, to obtain the $N^4$-acyl compounds. The $N^4$-acyl substituent is removed by acid hydrolysis at elevated temperatures in the event it is desired to prepare the parent sulfa compound.

In addition to their high activity against the poultry disease coccidiosis, the compounds of the present invention also demonstrate antibacterial activity, and in particular against strains of *Staphylococcus* and *Salmonella pullorum* and *Proteus vulgaris*.

The following examples are given for the purpose of illustration and not by way of limitation.

EXAMPLE 1

Coccidiostatic activity of 3-allyloxy-4-sulfanilamido-1,2,5 - thiadiazole was determined by the following method:

Groups of ten two-week old White Leghorn chicks were fed a mash diet containing graded amounts of 3-allyloxy-4-sulfanilamido-1,2,5-thiadiazole. The compound was uniformly dispersed in the feed. After having been on this ration for 24 hours, each chick was inoculated with 100,000 sporulated cocysts of *E. Brunetti*. Other groups of ten chicks were each fed a similar mash diet which contained no coccidiostat. These were also infected in the same manner after 24 hours and served as positive or infected controls. As positive controls, two to four groups of ten chicks each were employed. Still other groups of ten chicks each were fed the mash free of coccidiostat and were not infected with coccidiosis. These served as normal controls.

The diets were administered to the chicks for eight days following the date of infection. At the end of this time the infected birds were sacrificed. The cocyst count was determined by a microscopic examination of the cecal and intestinal homogenates.

The results employing the indicated amounts of coccidoiostat compound, and expressed as mean values, are set forth below:

| Compound | Percent compound in feed | Percent weight gain | Number of cocysts ×10⁻⁶ in surviving animals |
|---|---|---|---|
| Infected controls | | 63 | 9.3 |
| Normal controls | | 111 | 0.1 |
| 3-allyloxy-4-sulfanilamido-1,2,5-thiadiazole | 0.00075 | 68 | 4.9 |
| | 0.0015 | 96 | 1.5 |
| | 0.003 | 107 | <0.1 |
| | 0.006 | 103 | 0.7 |
| | 0.0125 | 110 | <0.1 |

EXAMPLE 2

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 100,000 sporulated cocysts of *Eimeria brunetti*. On the sixth day after inoculation all surviving birds were sacrificed and weighed. The small intestines were pooled in water, homogenized, and examined for cocysts. If the total count of cocysts was less than 30, the compound was rated as active.

The compounds listed were active at the dose levels shown:

| Compound: | Dose level percent by weight in feed |
|---|---|
| 3-allyloxy-4-sulfanilamido-1,2,5-thiadiazole | 0.0015 |
| 3 - methallyloxy - 4-sulfanilamido-1,2,5-thiadiazole | 0.003 |
| 3 - crotyloxy - 4-sulfanilamido-1,2,5-thiadiazole | 0.003 |
| 3-n-propoxy -4 - sulfanilamido-1,2,5-thiadiazole | 0.003 |
| 3 - ethoxy-4-sulfanilamido-1,2,5-thiadiazole | 0.003 |
| 3 - (2 - butynyloxy) - 4-sulfanilamido-1,2,5-thiadiazole | 0.0015 |
| 3 - (2 - propynyloxy)-4-sulfanilamido-1,2,5-thiadiazole | 0.0015 |

EXAMPLE 3

A mixture of 15.6 g. of 3-chloro-4-allyloxy-1,2,5-thiadiazole, 50.3 g. of sulfanilamide, 40.4 g. of potassium carbonate, and 15.0 g. of acetamide is stirred and heated at 145° C. for 25 minutes. The mixture is then cooled to 100° C., 200 ml. of water added, and the mixture distilled to a vapor temperature of 100° C. to remove any unchanged 3-chloro-4-allyloxy-1,2,5-thiadiazole. The residual mixture is then cooled to room temperature and the pH adjusted to 8.8 by addition of hydrochloric acid. Unchanged sulfanilamide precipitates and is separated by filtration and washed with water. The aqueous filtrate and washes are combined and acidified to pH 4.0 with hydrochloric acid. 3 - allyloxy-4-sulfanilamido-1,2,5-thiadiazole precipitates. It is filtered off and washed with water. This product is recrystallized from 500 ml. of 50% isopropanol, after treating the isopropanol solution with 5 g. of decolorizing charcoal, to yield 15.3 g. of pure 3-allyloxy-4-sulfanilamido-1,2,5-thiadiazole, M.P. 153–155° C.

EXAMPLE 4

A stirred mixture of 0.1 mole of 3-chloro-4-OR-1,2,5-thiadiazole, 51.6 g. (0.3 mole) of sulfanilamide, 41.4 g. (0.3 mole) of potassium carbonate and acetamide (0.8 gm. per gm. of 3-chloro-4-OR-1,2,5-thiadiazole) is heated for twenty-five minutes at 145° C. The mixture is cooled to about 50–60° C. and 320 ml. of water are added. The resulting mixture is distilled at atmospheric pressure until the vapor temperature reaches 100° C.—to distill unchanged 3 - chloro - 4-OR-1,2,5-thiadiazole. The residual mixture is cooled to 20° C. and the pH adjusted to 8.8 with concentrated hydrochloric acid. The resulting precipitate of sulfanilamide is separated by filtration and the filtrate brought to pH 3–4 with concentrated hydrochloric acid. 3-OR-4-sulfanilamido-1,2,5-thiadiazole precipitates. It is recovered by filtration and purified by recrystallizing from 50% acetic acid. The substances prepared in this way are listed in Table I.

TABLE I

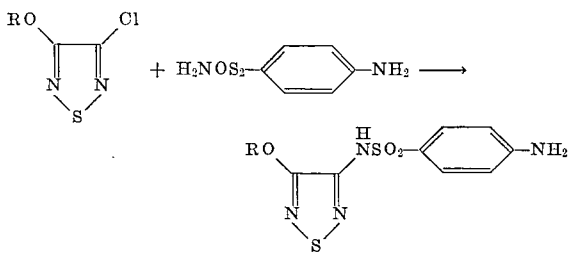

| R | Melting point of sulfa compound, °C. | U.V. of sulfa compound $\lambda_{max.}$ (E percent) | |
|---|---|---|---|
| | | Methanol | 0.1 N NaOH |
| a ...... —CH$_2$CH=CH$_2$ | 154–155 | 268 (718) | 302 (354) / 257 (542) |
| b ...... —CH$_2$C=C—CH$_3$ (H H) | 168–170 | | |
| c ...... CH$_2$C=CH$_2$ / CH$_3$ | 156–158 | | |
| d ...... —n-C$_3$H$_7$ | 158–160 | 268 (701) | 302 (357) / 257 (543) |
| e ...... C$_2$H$_5$ | 115–116 | 268 (706) | 302 (370) / 257 (558) |
| f ...... iso-C$_3$H$_7$ | 179–180 | 268 (685) | 302 (359) / 257 (554) |
| g ...... CH$_2$C≡C—CH$_3$ | 178–189 | 269 (706) | 302 (334) / 257 (547) |
| h ...... CH$_2$C≡CH | 141.5–143.5 | 269 (716) | 302 (347) / 257 (547) |

EXAMPLE 5

1.0 gram of 3-allyloxy-4-sulfanilamido-1,2,5-thiadiazole is added to 10 ml. of methanol. To the resulting mixture there is added 0.166 ml. of 19.3 N sodium hydroxide. A clear solution is formed which is evaporated in vacuo to a gummy residue. This residue consisting of the sodium salt of 3-allyloxy-4-sulfanilamido-1,2,5-thiadiazole is triturated and flushed twice with ethyl ether, then dried in vacuo at 40° C. 1.1 gram of sodium salt is obtained. It is highly soluble in water.

When the above is repeated using 3-(2-butynyloxy)- (or 2-propynyloxy)-4-sulfanilamido-1,2,5-thiadiazole, the sodium salt of 3-(2-butynyloxy)-(or 2-propynyloxy)-4-sulfanilamido-1,2,5-thiadiazole is obtained.

EXAMPLE 6

A mixture of 4 g. of 3-chloro-4-allyloxy-1,2,5-thiadiazole (0.0226 mole), 12 g. of N$^4$-acetyl sulfanilamido (0.056 mole), 7.7 g. of potassium carbonate (0.056 mole) and 10 g. of acetamide are heated at 145–150° C. for 45 minutes with stirring. The mixture is then cooled to room temperature and 100 ml. of water added to it. The resulting solution is distilled until the vapor temperature reaches about 100° C. The residual mixture is then cooled to about room temperature and the pH adjusted to 8.8 with concentrated hydrochloric acid. Unreacted N$^4$-acetyl sulfanilamide precipitates and is removed by filtration. The filtrate is adjusted to pH of about 4 by the addition of concentrated hydrochloric acid. 3-allyloxy-4-(N$^4$-acetyl sulfanilamido)-1,2,5-thiadiazole precipitates. The solid product is recovered by filtration and dissolved in a minimum volume of isopropanol. The isopropanol solution is treated with a small amount of decolorizing charcoal, the charcoal removed by filtration, and water added slowly to the filtrate until crystallization just begins. The mixture is then chilled for several hours, during which time 3-allyloxy-4-(N$^4$-acetyl sulfanilamido)-1,2,5-thiadiazole crystallizes. The product is recovered by filtration and dried in vacuo, M.P. 190–192° C., $\lambda_{max.}^{CH_3OH}$ (E%) = 263 (710): $\lambda_{max.}^{0.1\ N\ NaOH}$ (E%) = 303 (289) 256 (540).

When the above process is repeated employing N$^4$-benzoyl sulfanilamide as starting material, there is obtained 3-allyloxy-4-(N$^4$-benzoyl sulfanilamido)-1,2,5-thiadiazole.

The 3-chloro-4-loweralkoxy-1,2,5-thiadiazoles, the 3-chloro-4-loweralkynyloxy-1,2,5-thiadiazoles, and the 3-chloro-4-loweralkenyloxy-1,2,5-thiadiazoles which are used as starting materials in making the sulfathiadiazoles described herein are obtained by the alkylation, alkenylation, or alkynylation of 3-chloro-4-hydroxy-1,2,5-thiadiazole with an appropriate alkyl, alkynyl or alkenyl halide. 3-chloro-4-hydroxy-1,2,5-thiadiazole is prepared by the reaction of cyanoformamide with sulfur monochloride, as described below:

7.0 grams (0.1 mole) of 1-cyanoformamide is added to a solution of 32.4 ml. (54 gm.; 0.4 mole) of sulfur monochloride in 40 ml. of dimethyl formamide. The addition is carried out at room temperature over a 10 minute period. The resulting mixture is stirred for four hours at room temperature and then poured into 320 ml. of ice water. The resulting solution is filtered and the aqueous filtrate extracted with four 75 ml. portions of ethyl ether. The ether extracts are combined and washed with a small amount of water. They are then dried over magnesium sulfate and concentrated to dryness in vacuo. The residue that is obtained weighs 12 g. and consists predominantly of 3-chloro-4-hydroxy-1,2,5-thiadiazole. The product is recrystallized from water to give substantially pure material, M.P. 110–112° C.

A mixture of 1.36 g. (10 mmoles) of 3-chloro-4-hydroxy-1,2,5-thiadiazole, 1.06 g. (11 mmoles) of sodium carbonate, 13.3 mmoles of loweralkyl, loweralkenyl, or loweralkynyl halide, and 0.12 g. (0.8 mmoles) of sodium iodide in 25 ml. of dimethyl formamide is heated at 55–60° C., with stirring for 90 minutes. 150 ml. of water is then added to the reaction mixture, and the entire mixture extracted with 3×25 ml. of ether. The ether extracts are combined, dried over magnesium sulfate and concentrated to dryness in vacuo. The residual product is 3-chloro-4-loweralkoxy-(loweralkenyloxy or loweralkynyloxy)-1,2,5-thiadiazole. The 4-allyloxy-, 4-n-butoxy-, 4-crotyloxy- and 4-methallyloxy-3-chloro-1,2,5-thiadiazoles are obtained in this manner using allyl, n-butyl, crotyl and methallyl bromide, respectively, as the alkylating agent. The 4-n-propoxy, 4-isopropoxy and 4-ethoxy-3-chloro-1,2,5-thiadiazoles are obtained using n-propyl iodide, isopropyl iodide and ethyl iodide as the alkylating agents. Additionally, when 2-butynyl bromide, 3-butynyl bromide, and 2-propynyl bromide are the alkylating agents, the 4-(2-butynyloxy)-, 4-(3-butynyloxy)-, and 4-(2-propynyloxy)-3-chloro-, 1,2,5-thiadiazoles are obtained.

EXAMPLE 7

A mixture of 0.0226 mole of 3-chloro-4-(2-butynyloxy)-1,2,5-thiadiazole, 0.056 mole of N$^4$-acetylsulfanilamide, 0.056 mole of potassium carbonate and 10 g. of acetonitrile are heated at 145–150° C. for 45 minutes with stirring. The mixture is then cooled to room temperature and 100 ml. of water added to it. The resulting solution is distilled until the vapor temperature reaches about 100° C. The residual mixture is then cooled to about room temperature and the pH adjusted to 8.8 with concentrated hydrochloric acid. Unreacted N$^4$-acetyl sulfanilamide precipitates and is removed by filtration of concentrated hydrochloric acid. 3-(2-butynyloxy)-4-(N$^4$-acetyl sulfanilamido)-1,2,5-thiadiazole precipitates. The solid product is recovered by filtration and dissolved in a minimum volume of isopropanol. The isopropanol solution is treated with a small amount of decolorizing charcoal, the charcoal removed by filtration, and water added slowly to the filtrate until crystallization just begins. The mixture is then chilled for several hours, during which time 3-(2-butynyloxy)-4-(N$^4$-acetyl sulfanilamido)-1,2,5-thiadiazole crystallizes.

When the above process is repeated employing N$^4$-benzoyl sulfanilamide as the starting material, there is obtained 3-(2-butynyloxy)-4-(N$^4$-benzoyl sulfanilamido)-1,2,5-thiadiazole.

We claim:

1. An anticoccidial composition comprising a non-toxic orally ingestible carrier containing as an active anti-coccidial ingredient an anti-coccidially effective amount of a compound having the formula:

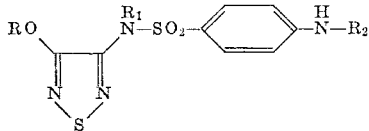

where R represents loweralkenyl, loweralkynyl, or loweralkyl having at least 2 carbon atoms, $R_1$ is hydrogen or an alkali metal and $R_2$ is hydrogen, loweralkanoyl, or benzoyl.

2. A composition according to claim 1 wherein R is allyl or 2-butynyl.

3. A composition according to claim 1 wherein the nontoxic ingestible carrier is an animal feedstuff.

4. A composition according to claim 3 containing from about 0.0005% to about 0.05% by weight of the active ingredient.

5. A composition according to claim 4 having as an active ingredient 3 - loweralkenyloxy - 4 - sulfanilamido-1,2,5-thiadiazole, or an alkali metal salt thereof.

6. A composition according to claim 4 having as an active ingredient 3 - loweralkynyloxy - 4 - sulfanilamido-1,2,5-thiadiazole, or an alkali metal salt thereof.

7. A composition according to claim 4 having as an active ingredient 3 - loweralkoxy - 4 - sulfanilamido-1,2,5-thiadiazole, or an alkali metal salt thereof.

8. A composition according to claim 4 having as an active ingredient 3 - allyloxy - 4 - sulfanilamido - 1,2,5-thiadiazole, or an alkali metal salt thereof.

9. A composition according to claim 1 wherein the carrier is a nutritive solid poultry feed additive.

10. A composition according to claim 9 wherein the active ingredient is 3 - loweralkenyloxy - 4 - sulfanilamido-1,2,5-thiadiazole, or an alkali metal salt thereof.

11. A composition according to claim 9 wherein the active ingredient is 3-loweralkynyloxy - 4 - sulfanilamido-1,2,5-thiadiazole, or an alkali metal salt thereof.

12. A composition according to claim 9 wherein the active ingredient is 3 - allyl - 4 - sulfanilamido - 1,2,5-thiadiazole, or an alkali metal salt thereof.

13. A composition according to claim 1 wherein the carrier is a water soluble carrier.

14. A composition according to claim 3 having as an active ingredient 3 - loweralkenyloxy - 4 - sulfanilamido-1,2,5-thiadiazole, or an alkali metal salt thereof.

15. A composition according to claim 3 having as an active ingredient 3 - loweralkynyloxy - 4 - sulfanilamido-1,2,5-thiadiazole, or an alkali metal salt thereof.

16. The method of combatting poultry coccidiosis that comprises orally administering to poultry an anticoccidially effective amount of a compound having the formula

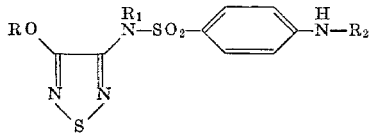

where R represents loweralkenyl, loweralkynyl, or loweralkyl, having at least 2 carbon atoms, $R_1$ is hydrogen, or an alkali metal, and $R_2$ is hydrogen, loweralkanoyl or benzoyl.

References Cited

UNITED STATES PATENTS 3,213,088  10/1965  Linz _____ 424—229
3,247,061  4/1966   Pfister _____ 424—229

SAM ROSEN, Primary Examiner

UNITED STATES PATENT OFFICE
CERTIFICATE OF CORRECTION

Patent No. 3,636,209          Dated January 18, 1972

Inventor(s) Leonard M. Weinstock, Roger J. Tull, & Peter I. Pollak

It is certified that error appears in the above-identified patent and that said Letters Patent are hereby corrected as shown below:

In Column 12, Claim 12, line 2, "allyl" should read

-- allyloxy --.

Signed and sealed this 26th day of September 1972.

(SEAL)
Attest:

EDWARD M. FLETCHER, JR.
Attesting Officer

ROBERT GOTTSCHALK
Commissioner of Patents